Oct. 23, 1945.  R. E. EGGERT ET AL  2,387,251
RESILIENT LOCK NUT
Filed Sept. 6, 1944   2 Sheets-Sheet 1

Inventor
RONALD EDGAR EGGERT
and HAROLD JOHN LeVESCONTE
By R. S. Burry
Attorney

Oct. 23, 1945.  R. E. EGGERT ET AL  2,387,251
RESILIENT LOCK NUT
Filed Sept. 6, 1944  2 Sheets-Sheet 2

Inventor
RONALD EDGAR EGGERT and
HAROLD JOHN LEVESCONTE
By R. S. Burns
Attorney

Patented Oct. 23, 1945

2,387,251

UNITED STATES PATENT OFFICE 2,387,251

RESILIENT LOCK NUT

Ronald Edgar Eggert, Burbank, and Harold John Le Vesconte, Glendale, Calif., assignors to Adel Precision Products Corp., a corporation of California Application September 6, 1944, Serial No. 553,130

20 Claims. (Cl. 85—36)

This invention relates to lock nuts of the type made of a resilient sheet metal body member or base having integral elements arranged so as to have tensioned and threaded engagement with a screw or bolt turned in an opening in the body member, and the main objects thereof are as follows:

1. To provide a self locking nut of the character described which is stronger, more durable and less likely to become distorted and unfit for use under repeated application to a screw or bolt.

2. To provide such a nut wherein locking elements, portions or tongues are arranged to bite into the member or object against which the nut abuts to prevent the nut from turning, as well as to have tensioned, screw-threaded and locking engagement with the screw or bolt, whereby the dual locking action thus afforded positively holds the nut in place.

3. The provision of a nut such as described which can be quickly and easily stamped from sheet metal stock with simple stamping operations on simple and inexpensive equipment, thereby making for expeditious production of the nuts in large quantities at a low cost.

4. The provision of a nut such as described which affords advantages hereof by reason of forming the bolt or screw engaging elements so that they extend side by side instead of in end to end relation and have opposed side edges arranged to receive therebetween in tensioned and screw-threaded engagement therewith a screw, bolt, or the like.

5. To provide such a nut wherein the free ends of the tongues are positioned so that spreading apart thereof with incident disengagement of the threads of the bolt, etc., is prevented.

6. To provide a fastening such as described in which the bolt-engaging elements or tongues are formed so that portions thereof will substantially encircle and have tensioned and screw threaded contact with a bolt or the like turned therebetween.

With the foregoing objects in view, together with such other objects and advantages as may subsequently appear, the invention resides in the parts and in the combination, construction and arrangement of parts hereinafter described and claimed, and illustrated by way of example in the accompanying drawings, in which:

Figure 1:
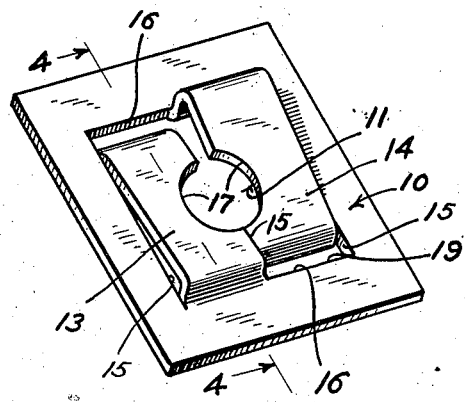
Fig. 1 is a perspective view of a nut embodying our invention.
Figure 2:
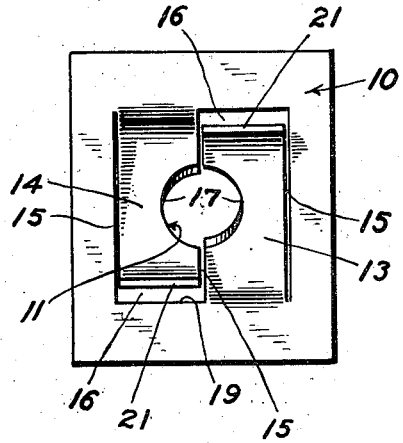
Fig. 2 is a bottom plan view of the nut.
Figure 3:
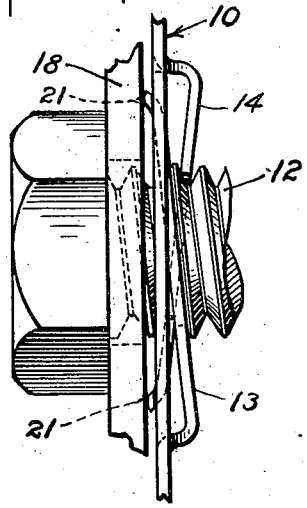
Fig. 3 is a side elevation of the nut as applied.
Figure 4:
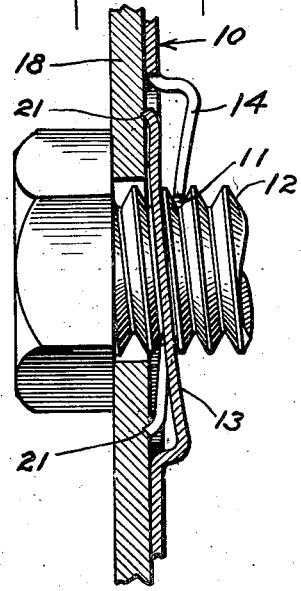
Fig. 4 is a fragmentary longitudinal sectional view of the nut as applied, taken on line 4—4 of Fig. 1.
Figure 5:
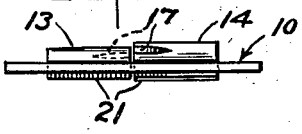
Fig. 5 is an end elevation of the nut.

One embodiment of our invention as shown in detail in the accompanying drawings includes a plate-like body member or base 10 made of a suitable resilient sheet metal and provided with a central opening 11 to receive a bolt or screw such as the bolt 12 here shown.

Elongated bolt engaging elements, portions or tongues 13 and 14 are struck out from the body member to lie side by side, as shown in Figs. 1 to 4 inclusive, with their free ends spaced inwardly from opposite edges of the body member. In forming the laterally juxtaposed elements 13 and 14 there are provided three spaced parallel slits 15 extending longitudinally of the body member and two transverse slits 16 connecting the ends of the middle slit 15 with the opposite ends of the outer slits 15.

As here shown the opposed side edges of the elements 13 and 14 are formed between their ends with complementary arcuate edge portions 17 which define the opening 11 and are adapted to have tensioned screw-threaded engagement with the bolt 12. In other words the elements 13 and 14 have opposed marginal portions provided with apertures contoured for engagement with screw threads and to encircle the screw or bolt engaged thereby.

In accordance with our invention the elements 13 and 14 are inclined in opposite directions and arranged so that the arcuate edges 17 are given a spiral pitch, or in other words disposed in approximately the helical angle of the screw threads of the bolt and for the most part off-set from the plane of the body in order to have a spring action and yield into the proper pitch for an effective screw threaded engagement with a bolt turned therebetween. Upon the final tightening into the bolt, the elements 13 and 14 will be bowed inwardly into a tensioned and locking engagement with the bolt such that accidental loosening of the nut will be prevented.

As shown in Figs. 1 to 4, the elements 13 and 14 are formed and disposed so that the free ends thereof normally extend somewhat beyond the plane of the inner side of the body member whereby said free ends will be forced inwardly upon the tightening of the bolt and bite into the member or object 18 against which the nut abuts, to prevent turning of the nut, thereby further locking it in place. Moreover, the ends of the elements 13 and 14 in being disposed in the openings 19 formed in striking said elements from the body member 10 will prevent lateral or other displacement of the tongues which would spread them apart, when the bolt is turned in the opening 11. Furthermore this extension of the free ends of the bolt engaging elements beyond the plane of the inner face of the body member, causes said ends to engage the member or object 18 in advance of the body portion 10 thereby putting the elements under tension as the bolt is tightened.

As shown the elements or tongues 13 and 14 may be formed so as to have inwardly turned free ends forming spurs 21 so that said spurs will more readily bite into the member 18 against which the nut abuts and effectively hold the nut against turning to thus obtain an additional nut locking action. Moreover these inturned ends or spurs 21 will abut the side edges of the openings 19 in the body member 10 when the elements 13 and 14 tend to spread apart, thereby assuring that said elements will remain at all times in proper relation to one another for a screw threaded engagement with the bolt.

Figure 6:
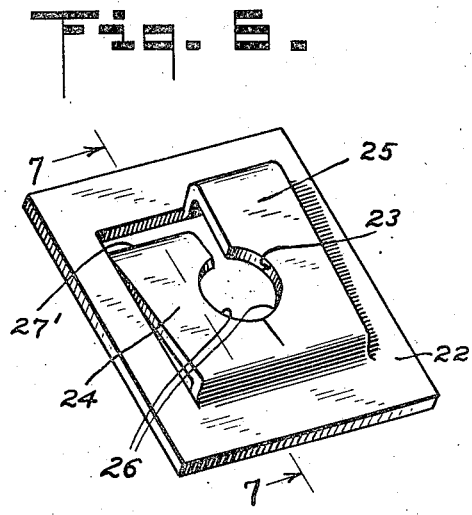
Fig. 6 is a fragmentary perspective view of a modified form of this invention.
Figure 7:
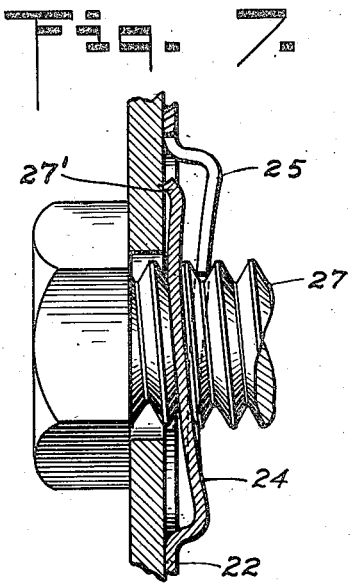
Fig. 7 is a fragmentary sectional view of the nut shown in Fig. 6 as in use, taken on line 7—7 of Fig. 6.

Figs. 6 and 7 show a modified form of our invention in which the body member or base 22 is formed of resilient sheet metal and has a bolt opening 23 therein and one struck-out bolt engaging element or tongue 24 corresponding to one of the elements 13 and 14 shown in Figs. 1 to 4. In this form of our invention an elongated bridge-like bolt-engaging element 25 is struck out from the body portion to lie alongside the tongue 24, both ends of the element 25 being integral with the body member but said element being resilient and subject to a spring action, by reason of being outwardly offset between its ends. Opposed arcuate side edge portions 26 of the elements 24 and 25 located between the ends of said elements define the opening 23 for the bolt 27 and as said elements are oppositely inclined at least adjacent said opening in the same manner as shown in Figs. 1 to 4, said side edge portions will have a tensioned screw threaded engagement with the bolt in the same manner as takes place with the nut shown in Figs. 1 to 4. The free end of the tongue element 24 is bent inward to form a spur 27' in the same manner and for the same purposes as the spurs shown in Figs. 1 to 4. This modified construction is better suited for a heavier nut that is, a nut adapted to be heavily loaded inasmuch as the integral formation of the element 25 affords considerable strength and rigidity yet does not impair the "locking" action of the nut.

Figure 8:
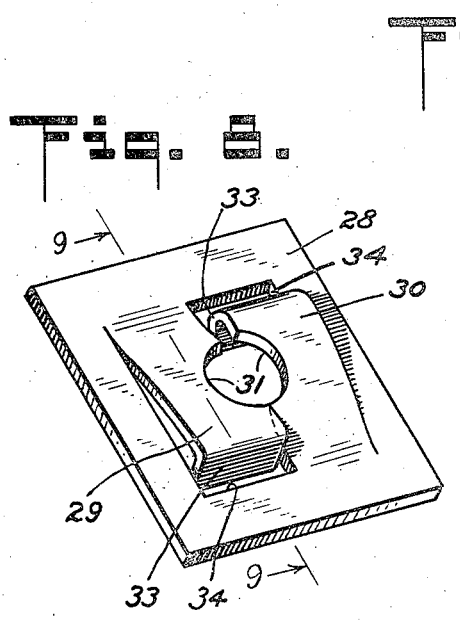
Fig. 8 is a perspective view of another modified form of the invention.
Figure 9:
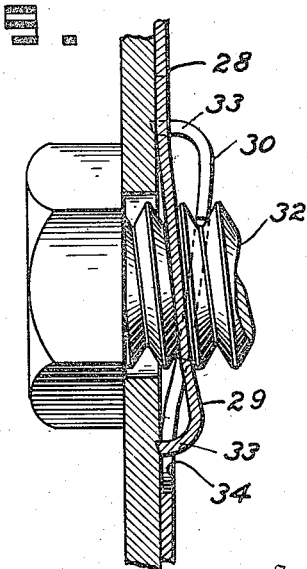
Fig. 9 is a fragmentary sectional view of the nut shown in Fig. 8 as in use, taken on line 9—9 of Fig. 8.

Another modification of this invention as shown in Figs. 8 and 9 comprises a resilient sheet metal body member 28 and outwardly struck oppositely inclined tongue-like elements 29 and 30 corresponding to the body member and elements shown in Figs. 1 to 4 except that the integral or inner ends of said elements are nearer to the plane of the base or body portion or lower than the remainder thereof and said elements are outwardly inclined in opposite directions from said inner ends, being in effect the reverse of the arrangement shown in Figs. 1 to 4 wherein the inner end portions of the elements extend outwardly from the body member a greater extent than the "free" ends. Arcuate side edge portions 31 define a bolt receiving opening in the same manner as shown in Figs. 1 to 4 and are arranged to have a tensioned screw threaded engagement with the bolt 32. The free end portions of the elements 29 and 30 have comparatively long inward bends 33 acting as spurs extending into the openings 34 in the body for the same purposes as the unturned ends shown in Figs. 1 to 4. This form of the invention affords all of the advantages of the form of nut shown in Figs. 1 to 4 and may prove more desirable in certain instances and respects one of which latter being that less distortion of the tongues at their inner or integral ends and consequent possible weakening thereof, is had than with the tongues shown in Figs. 1 to 4.

It is important to note that the embodiments of the invention here shown may be said to constitute a fastening cooperable with a screw threaded male member and in which struck-out tongue members lie side by side in intersecting planes and have side edge portions defining a circle of approximately the root diameter of the screw thread to be engaged thereby, thus providing for an effective encirclement of the screw threaded member and a secure holding of both fastening elements in place.

While we have shown and described specific embodiments of our invention we do not limit ourselves to the exact details of construction set forth, and the invention embraces such changes, modifications and equivalents of the parts and their formation and arrangement as come within the purview of the appended claims.

We claim:

1. In a nut, a plate-like body member, and elongated elements struck out from said body member so as to lie side by side in integral formation with the body member at points spaced inwardly of margins of the body member, said elongated elements having portions intermediate their ends disposed in outwardly offset relation to the body member, said offset portions having opposed side edges between which a screw threaded member may be turned so as to have screw threaded engagement therewith.

2. In a nut, a resilient body member, and portions of said body member between end edges thereof being struck out from the plane of the body member to provide resilient elements lying side by side and having opposed side edge portions defining an opening in which a screw threaded member may be turned so as to have screw threaded engagement therewith, said struck out elements being inclined in opposite directions.

3. In a nut, a resilient body member, and tongues struck out from said body member so as to lie side by side with their free ends spaced inwardly from opposite edges of the body member, said tongues having opposed side edge portions between which a screw threaded member may be turned so as to have screw threaded and tensioned engagement therewith, the free ends of the tongues being disposed within the openings formed in the body portion by striking the tongues therefrom and adapted to contact the member or object against which the nut abuts, to prevent turning of the nut relative to the fastening member.

4. In a nut, a resilient sheet metal body member, and tongues struck out from said body member and having complementary side edge portions defining an opening in which a screw or bolt may be turned so as to have tensioned and screw threaded engagement with said edge portions, said tongues being oppositely inclined.

5. In a nut, a resilient sheet metal body member, and tongues struck out from said body member, having arcuate complementary side edge portions defining an opening in which a screw or bolt may be turned so as to have tensioned and screw threaded engagement therewith, said tongues being oppositely inclined said arcuate edge portions being approximately centrally of the ends of the tongues, said opening being in the approximate center of the body portion.

6. In a nut, a resilient sheet metal body member, and tongues struck out from said body member to extend in opposite directions having arcuate complementary side edge portions defining an opening in which a screw or bolt may be turned so as to have tensioned and screw threaded engagement therewith and having portions extending into the opening formed in the body portion in striking out said tongues and adapted to engage the member or object against which the body portion abuts.

7. In a nut, a resilient body member, and tongues struck out from said body member so as to lie side by side having opposed side portions spaced apart so that a screw threaded member may be turned therebetween in screw threaded and tensioned engagement therewith, the free ends of the tongues being bent inwardly and extended through the openings defined in the body portion in striking out said tongue, and normally disposed beyond the plane of the body portion so as to contact said member or object in advance of the body portion.

8. In a nut, a resilient body member, and tongues struck out from said body member with their free ends spaced inwardly from opposite edges of the body member, said tongues having opposed side edge portions spaced apart so that a screw threaded member may be turned therebetween so as to have screw threaded and tensioned engagement therewith, the free ends of the tongues being turned inwardly to form spurs disposed within the openings formed by striking the tongues from said body member and adapted to contact the member or object against which the nut abuts, to prevent turning of the nut relative to the fastening member, said spurs arranged to abut the side edges of said openings to resist spreading apart of said side edge portions.

9. In a nut, a resilient body member, bolt-engaging elements struck out from said body member having opposed portions spaced apart so that a screw threaded member may be turned therebetween so as to have screw threaded and tensioned engagement therewith, and other portions on said elements disposed within the openings formed by striking the elements from said body member and adapted to contact the member or object against which the nut abuts, to prevent turning of the nut relative to the fastening member.

10. In a nut, a resilient body member, bolt-engaging elements struck out from said body member having opposed portions spaced apart so that a screw threaded member may be turned therebetween so as to have screw threaded and tensioned engagement therewith, and other portions on said elements adapted to engage the side edges of the opening formed in the body member by striking said elements therefrom to prevent said elements from spreading apart.

11. In a fastening for cooperation with a screw threaded male element, a sheet metal body member, and integral oppositely disposed resilient tongues provided within the confines of said member as portions of the latter struck out between margins thereof and lying in intersecting planes at acute angles to the plane of said body member, the adjacent edges of said tongues being provided with edge portions defining an opening of approximately the root diameter of the screw thread to be engaged thereby, said edge portions being disposed for threaded engagement with the screw threaded element.

12. In a fastening for cooperation with a screw threaded male element, a sheet metal body member, and integral resilient tongues constituting portions struck out between margins of the body member and lying side by side in intersecting planes disposed at an acute angle to the plane of said body member, opposed side edges of said tongues substantially midway between the ends of the tongues being provided with arcuate portions the radii of which are substantially equal to the radius of the root circle of the screw thread to be engaged thereby.

13. A fastening cooperable with a screw threaded male element, comprising a sheet metal body member provided within the periphery thereof with integral oppositely disposed resilient tongues which are struck out from portions of the body member to lie with their side edges in opposed relation and in intersecting planes disposed at an acute angle to the plane of said body member, the adjacent edges of said tongues being provided with arcuate portions the radii of which are not greater than the radius of the pitch circle of the screw thread to be engaged thereby.

14. As an article of manufacture, a fastening for threaded engagement with a screw threaded element comprising in a unitary structure, a base portion having one face thereof adapted to engage the face of an object through which the screw threaded element passes, and laterally juxtaposed members punched out from the plane of the other face of said base portion between opposed margins of said base portion and having thread engaging portions disposed in oppositely inclined planes which intersect along a line normal to the base portion and substantially tangent to the pitch circle of the threads of the threaded element.

15. In a nut, a body member and resilient elongated elements struck out from said body member between opposed margins of the latter so as to lie in offset relation thereto and in side by side relation to one another with portions of opposed longitudinal edges thereof in spaced apart relation and constructed and arranged for a screw threaded engagement with a screw threaded fastening turned therebetween.

16. In a nut, a sheet metal body member, and resilient elongated elements joined to said body member at points spaced inwardly from opposite margins of the body member and having side edge portions outwardly offset from one side of the body member and spaced apart for a screw threaded engagement with a screw threaded fastening turned therebetween.

17. A nut comprising an elongated base member, and a pair of laterally juxtaposed resilient elements on said base member formed intermediate their ends with apertures having their margins contoured for engagement with the threads of a screw threaded member turned in said apertures each of said elements being connected to said base member at a point spaced inwardly of an end margin of the base member, and at least one of said elements having a free end tensioned to yieldably oppose flexing in any direction relative to said base.

18. In a nut, a body member and resilient elements carried by said body member in offset relation thereto and in side by side relation to one another with portions of opposed side edges thereof in spaced apart relation for a screw threaded and tensioned engagement with a screw threaded fastening turned therebetween, one of said members being formed integral at both ends with said body member and the other of said elements being formed integral with the body member at one end and free therefrom at its other end.

19. In a nut, a resilient sheet metal body member, and tongues struck out from said body member and having complementary side edge portions defining an opening in which a screw or bolt may be turned so as to have tensioned and screw threaded engagement with said edge portions, said tongues being oppositely inclined, and extended first divergently outward from their inner ends then inwardly towards the base so that the free ends thereof will lie in openings formed in body by the struck-out tongue.

20. In a nut, a resilient body member, and tongues struck out from said body member so as to lie side by side with their free ends spaced inwardly from opposite edges of the body member, said tongues having opposed side edge portions between which a screw threaded member may be turned so as to have screw threaded and tensioned engagement therewith, the free ends of the tongues being disposed within the openings formed in the body portion by striking the tongues therefrom and adapted to contact the member or object against which the nut abuts, to prevent turning of the nut relative to the fastening member, said tongues being inclined outwardly from the body member toward their free ends and being spaced outwardly of the body member a greater extent at points between said side edge portions and said free ends, said free ends being turned inwardly toward said body member.

RONALD EDGAR EGGERT.
HAROLD JOHN LE VESCONTE.